United States Patent [19]

Katayose et al.

[11] 4,416,230
[45] Nov. 22, 1983

[54] ENGINE CONTROL APPARATUS

[75] Inventors: Shinji Katayose, Tokyo; Masatsugu Ohwada, Yokosuka; Takashi Oka, Tokyo, all of Japan

[73] Assignee: Nissan Motor Company, Limited, Yokohama, Japan

[21] Appl. No.: 408,629

[22] Filed: Aug. 16, 1982

[30] Foreign Application Priority Data

Aug. 19, 1981 [JP] Japan ............................... 56-130469

[51] Int. Cl.³ ........................................... F02D 33/00
[52] U.S. Cl. .................................... 123/325; 123/333; 123/179 G; 123/198 DB
[58] Field of Search ............... 123/320, 325, 332, 333, 123/334, 179 G, 179 B, 179 BG, 198 F, 198 DB, 198 DC

[56] References Cited

U.S. PATENT DOCUMENTS

| | | | |
|---|---|---|---|
| 3,703,162 | 11/1972 | Aono | 123/325 |
| 4,153,033 | 5/1979 | Iizuka | 123/198 F |
| 4,192,279 | 3/1980 | Maisch et al. | 123/325 |
| 4,305,365 | 12/1981 | Iizuka et al. | 123/325 |
| 4,322,947 | 4/1982 | Wössner et al. | 123/325 |
| 4,362,133 | 12/1982 | Malik | 123/179 G |
| 4,371,050 | 2/1983 | Ikeura | 123/198 DB |

FOREIGN PATENT DOCUMENTS

| | |
|---|---|
| 2449202 | European Pat. Off. |
| 50-9636 | 1/1975 Japan . |
| 51-38968 | 10/1976 Japan . |
| 2062291 | 5/1981 United Kingdom . |
| 2069180 | 8/1981 United Kingdom . |

*Primary Examiner*—William A. Cuchlinski, Jr.
*Attorney, Agent, or Firm*—Schwartz, Jeffery, Schwaab, Mack, Blumenthal & Koch

[57] ABSTRACT

An engine control apparatus comprises a fuelcut control circuit for terminating delivery of fuel to the engine when the throttle valve opens at an angle less than a predetermined value and the transmission is in high gear or in neutral. The apparatus also comprises means for preventing the fuelcut control circuit from terminating fuel delivery to the engine when the pressure stored in a brake booster increases to a level insufficient for application of braking to the vehicle.

7 Claims, 5 Drawing Figures

ENGINE CONTROL APPARATUS

BACKGROUND OF THE INVENTION

This invention relates to an apparatus for controlling an internal combustion engine of an automotive vehicle and, more particularly, to such an engine control apparatus for terminating delivery of fuel to the engine in selected modes of engine operation.

Various engine control apparatus have been proposed in the past for terminating delivery of fuel to an internal combustion engine in selected modes of engine operation, but such prior apparatus have demonstrated very poor fuel economy.

A conventional engine control apparatus includes a solenoid valve provided in a fuel conduit through which fuel is delivered to an internal combustion engine. The solenoid valve is connected a potential source through a parallel circuit of a clutch switch which is closed when the clutch is disengaged, a neutral switch which is closed when the transmission is in neutral, a throttle switch which is closed when the throttle valve opens over a predetermined angle, and a relay switch which is closed when the vehicle speed exceeds a predetermined value. The solenoid valve closes to terminate fuel delivery to the engine only when all of these switches are open. Therefore, such a conventional apparatus cannot save unnecessary fuel when the clutch is disengaged, the transmission is in neutral, or the vehicle is at rest.

A second type of conventional engine control apparatus includes a clutch pedal switch for generating a signal indicative of the clutch pedal being depressed, a vehicle speed sensor for generating a signal indicative of the vehicle being running, and a control circuit for connecting the ignition system to a power source in response to the signal from the clutch pedal switch or the signal from the vehicle speed sensor. The control circuit disconnects the ignition system from the power source to bring the engine to a stop in the absence of the signal from the clutch pedal switch and the signal from the vehicle speed source. Therefore, such a conventional apparatus cannot save unnecessary fuel during deceleration.

Furthermore, for automotive vehicles employing a brake booster which utilizes vacuum created in the intake manifold of the engine in applying brakes to the vehicle, the vacuum in the brake booster will fall to a level insufficient for application of braking to the vehicle when the brake pedal is depressed several times after fuel delivery to the engine is terminated to bring the engine to a stop. This results in failure to ensure safety during vehicle running.

The present invention provides an improved engine control apparatus which can save unnecessary fuel in selected modes of engine operation to achieve more fuel economy and less exhaust emission and which can maintain brake booster vacuum level sufficient for application of braking to assure safety during vehicle running.

SUMMARY OF THE INVENTION

There is provided, in accordance with the present invention, an apparatus for controlling an internal combustion engine of an automotive vehicle having a transmission, a clutch, a throttle valve, a brake booster storing therein pressure supplied from an engine intake manifold, and sources for generating signals indicative of: (a) the throttle valve opening at an angle less than a predetermined value, (b) the transmission being in high gear or in neutral, (c) the transmission being in low gear, (d) the clutch being disengaged, and (e) the engine operating at a speed less than a predetermined value. The apparatus comprises first means for generating a signal (f) when the pressure in the brake booster falls below a second predetermined value lower than the first predetermined value. The apparatus also comprises second means for terminating delivery of fuel to the engine upon the occurrence of two conditions indicated by signals (a) and (b), third means for restarting the engine upon the occurrence of three conditions indicated by signals (c), (d) and (e) or upon the occurrence of two conditions indicated by signals (e) and (f), and fourth means for preventing the second means from terminating fuel delivery to the engine upon the occurrence of one condition indicated by signal (f).

Preferably, the third means includes means for preventing the third means from restarting the engine until the transmission is shifted into neutral or the clutch is disengaged in spite of the occurrence of two conditions indicated by signals (e) and (f).

BRIEF DESCRIPTION OF THE DRAWINGS

The details as well as other features and advantages of this invention are set forth below and are shown in the accompanying drawings, in which.

Figure 1:
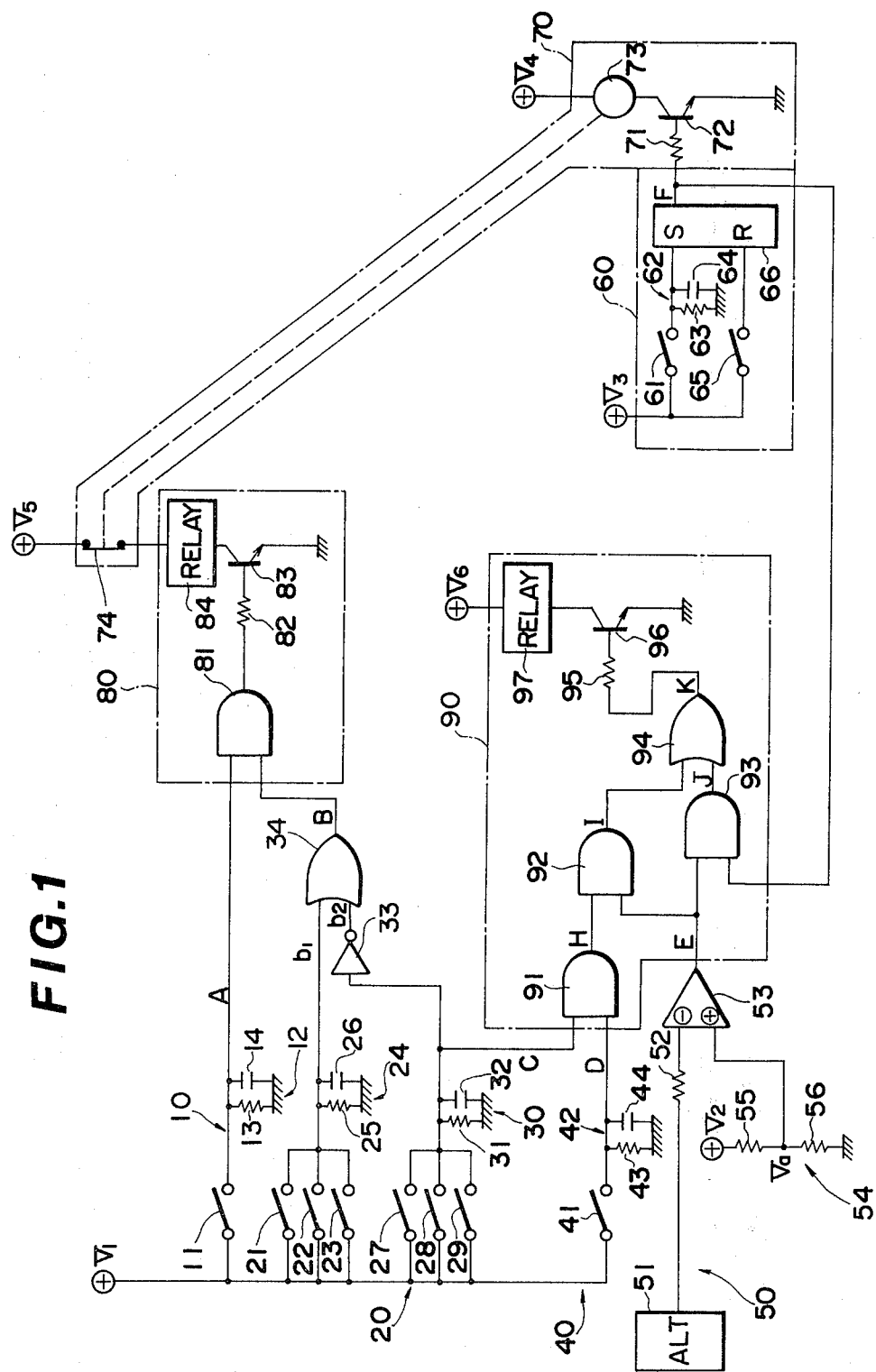
FIG. 1 is a circuit diagram showing one embodiment of an engine control apparatus made in accordance with the present invention.

With reference now to the conventional engine control apparatus shown in the PRIOR ART figure, fuel to an internal combustion engine is supplied through a fuel conduit 1 having therein a solenoid valve 2 which opens to permit fuel delivery to the engine when energized and closes to block fuel flow through the fuel conduit 1 when deenergized. The solenoid valve 2 is connected to a source of potential 3 through a parallel circuit of a clutch switch 4, a neutral switch 5, a throttle switch 6, and a relay switch 7. The clutch switch 4 closes when the clutch pedal is depressed to disengage the clutch. The neutral switch 5 closes when the transmission is in neutral. The throttle switch 6 opens when the throttle valve 8 opens at an angle less than a predetermined value. The relay switch 7 closes when the vehicle is running at a speed more than a predetermined value. Therefore, the solenoid valve can close to terminate fuel delivery to the engine only when all of the switches 4, 5, 6 and 7 open, that is, only when the clutch is engaged, the transmission is not in neutral, the throttle valve opens at an angle less than a predetermined value, and the vehicle is running at a speed less than a predetermined value.

DESCRIPTION OF THE PREFERRED EMBODIMENTS

Referring now to FIG. 1 of the drawings, there is illustrated one embodiment of an engine control apparatus made in accordance with the present invention, wherein it is contemplated for use in conjunction with an automotive vehicle equipped with a manual transmission. The engine control apparatus comprises various sensors including a throttle position sensor 10, a gear position sensor 20, a clutch position sensor 40, an engine speed sensor 50, and a pressure level sensor 60.

The throttle position sensor 10 includes a throttle switch 11 which is associated with a throttle valve (not shown but well known in the art) situated within the induction passage for controlling the flow of air or air-fuel mixture to the engine depending upon the amount of an accelerator pedal is depressed. The throttle switch 11 closes when the throttle valve position is at an angle less than a predetermined value, for example, 6.5° open. The throttle switch 11 is connected at its first terminal to a source of constant voltage V1. The second terminal of the throttle switch 11 is connected to ground through a parallel circuit 12 of a resistor 13 and a capacitor 14 and also to a fuelcut control circuit to be described later. The parallel circuit 12 establishes a delay circuit which is effective to keep the circuit free from malfunctions which would occur during transition of operation of the throttle switch 11. When the throttle switch 11 closes, the constant voltage V1 appears at the throttle switch second terminal to provide a signal A to the fuelcut control circuit with a delay, which is determined by the time constant ta of the parallel circuit 12, with respect to the closure of the throttle switch 11. Thus, the throttle position sensor 10 generates the signal A to the fuelcut control circuit when the throttle valve position is at an angle less than a predetermined value.

The gear position sensor 20 includes a plurality of gear switches 21-23 and 27-29 which are associated with a manual transmission (not shown but well known in the art) and adapted to close depending upon the driver's operation of the transmission shift lever to select one of the transmission gears. The gear switch 21 closes when the third forward speed gear is selected, the gear switch 22 closes when the fourth forward speed gear is selected, and the gear switch 23 closes when the fifth forward speed gear is selected. That is, any one of the gear switches 21-23 closes when the transmission is in high gear. The gear switches 21-23 are connected at their first terminals to the source of constant voltage V1, and at their second terminals to ground through a parallel circuit 24 of a resistor 25 and a capacitor 26 and also to a first input of an OR circuit 34. The parallel circuit 24 establishes a delay circuit which is effective to keep the circuit free from malfunctions which would occur during transition of operation of the gear switches 21-23. When any one of the gear switches 21-23 closes, the constant voltage V1 appears at its second terminal to provide a signal "b1" to the first input of the OR circuit 34 with a delay, which is determined by the time constant tb of the parallel circuit 24, with respect to the closure of the gear switch. The gear switch 27 closes when the reverse gear is selected, the gear switch 28 closes when the first forward speed gear is selected, and the gear switch 29 closes when the second forward speed gear is selected. That is, any one of the gear switches 27-29 will close if the transmission is in low gear. The gear switches 27-29 are connected at their first terminals to the source of constant voltage V1. The second terminals of the gear switches 27-29 are connected to ground through a parallel circuit 30 of a resistor 31 and a capacitor 32, to a second input of the OR circuit 34 through an inverter 33, and to a restart control circuit to be described later. The parallel circuit 30 establishes a delay circuit which is effective to keep the circuit free from malfunctions which would occur during transition of operation of the gear switches 27-29. When any one of the gear switch 27-29 closes, the constant voltage V1 appears at its second terminal to provide a signal C to the inverter 33 and also to the restart control circuit with a delay, which is determined by the time constant tc of the parallel circuit 30, with respect to the closure of the gear switch. The output of the inverter 33 goes low in the presence of the signal C and goes high to provide a signal "b2" to the second input of the OR circuit 34 in the absence of the signal C. The output of the OR circuit 34 goes high to provide a signal B to the fuelcut control circuit when it receives at its first input the signal "b1" or at its second input the signal "b2." When the transmission is neutral, the output of the inverter is high to generate the signal "b2" so as to cause the OR circuit 34 to generate the signal B since the gear switches 27-29 remain open and the inverter 33 does not receive the signal C. Thus, the gear position sensor 20 generates the signal B to the fuelcut control circuit only when the transmission is in high gear or in neutral, and generates the signal C to the restart control circuit only when the transmission is in low gear.

The clutch position sensor 40 includes a clutch switch 41 which is associated with a clutch pedal (not shown but well known in the art) and adapted to close when the amount of the clutch pedal is depressed exceeds a predetermined value to disengage the clutch. The clutch switch 41 is connected at its first terminal to the source of constant voltage V1. The second terminal of the clutch switch 41 is connected to ground through a parallel circuit 42 of a resistor 43 and a capacitor 44 and also to the restart control circuit. The parallel circuit 42 establishes a delay circuit which is effective to keep the circuit free from malfunctions which would occur during transition of operation of the clutch switch 41. When the clutch switch 41 closes, the constant voltage V1 appears at the clutch switch second terminal to provide a signal D to the restart control circuit with a delay, which is determined by the time constant td of the parallel circuit 42, with respect to the closure of the clutch switch 41. Thus, the clutch position sensor 40 generates the signal D to the restart control circuit when the clutch is disengaged.

The engine speed sensor 50 includes an alternator 51 which is drivingly connected to an engine shaft (not shown) for generating a voltage signal proportional to the speed of rotation of the engine. The output of the alternator 51 is coupled through a resistor 52 to a negative input of a comparator 53. A pair of resistors 55 and 56 are connected in series between a source of constant voltage V2 and ground to form a voltage divider 54, the junction of the resistors 55 and 56 being connected to a positive input of the comparator 53. The value of the resistors 55 and 56 is chosen such that the reference voltage Va, which is presented to the positive input of the comparator 53, corresponds to a desired reference value of engine speed. Preferably, the engine speed reference value is somewhat less than engine idle speed. The output of the comparator 53 goes high to generate a signal E to the restart control circuit when the voltage at the negative input of the comparator is less than the reference voltage Va. Thus, the engine speed sensor 50 generates the signal E to the restart control circuit when the engine is operating at a speed less than a predetermined value. It is to be understood that the engine speed sensor is not limited to such structure employing an alternator. Alternatively, a crankshaft position sensor may be used.

The pressure level sensor 60 includes first and second pressure switches 61 and 65 associated with a brake booster having a vacuum chamber supplied with negative pressure from the intake manifold of the engine. The first pressure switch 65 closes when the pressure in the brake-booster vacuum chamber is above a first reference level. The second pressure switch 65 closes when the pressure in the brake-booster vacuum chamber is below a second reference level lower than the first reference level.

The first pressure switch 61 is connected at its first terminal to a source of constant voltage V3. The second terminal of the first pressure switch 61 is connected to ground through a parallel circuit 62 of a resistor 63 and a capacitor 64 and also to the set input S of a flip-flop 66. The parallel circuit 62 establishes a delay circuit which is effective to keep the circuit free from malfunctions which would occur during transition of operation of the first pressure switch 61. When the first pressure switch 61 closes, the constant voltage V3 appears at the first pressure switch second terminal to provide a set signal with a delay, which is determined by the time constant te of the parallel circuit 62, with respect to the closure of the first pressure switch 61. The set signal is supplied to the set input S of the flip-flop 66 which thereby switches into its second stable state generating a signal F.

The second pressure switch 65 is connected at its first terminal to the source of constant voltage V3. The second terminal of the second pressure switch 65 is connected to the reset input R of the flip-flop 66. When the second pressure switch 65 closes, the constant voltage V3 appears at the second pressure switch second terminal to provide a reset signal to the reset input R of the flip-flop 66 which thereby returns to its first stable state terminating the generation of the signal F.

Figure 2:
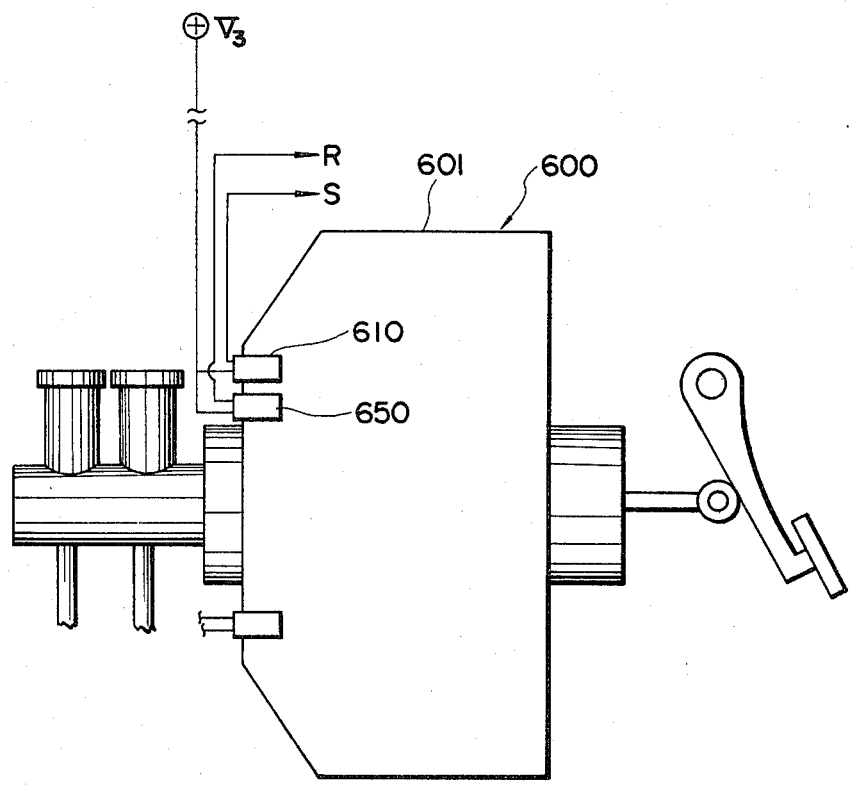
FIG. 2 is a schematic view showing vacuum sensors used in the apparatus of FIG. 1 for sensing pressure stored in a brake-booster vacuum chamber.

Referring now to FIG. 2, the brake booster 600 has a power cylinder 601 formed with the vacuum chamber supplied with negative pressure from the engine intake manifold. The level of the pressure in the vacuum chamber is sensed by first and second vacuum sensors 610 and 650 having therein the first and second pressure switches 61 and 65, respectively. The first and second vacuum sensors 610 and 650 are connected to the source of constant voltage V3. The output of the first vacuum sensor 610 is connected to the set input S of the flip-flop 66. The output of the second vacuum sensor 650 is connected to the reset input R of the flip-flop 66.

Figure 3:
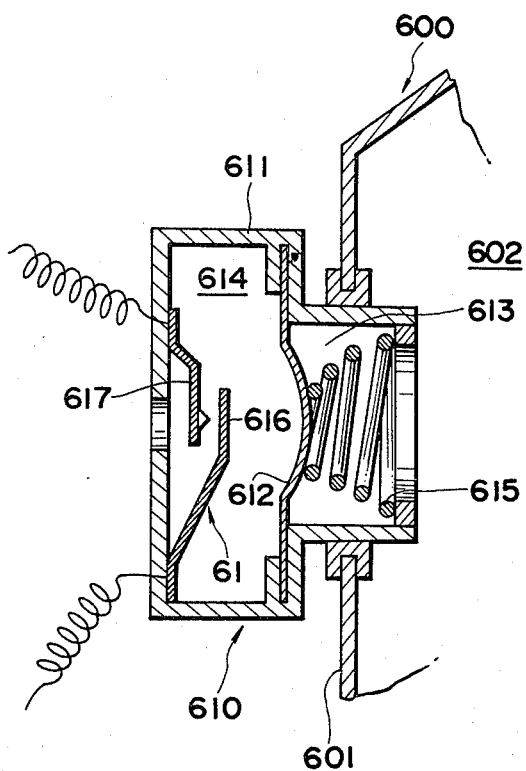
FIG. 3 is an enlarged sectional view showing the vacuum sensor of FIG. 2.

Referring now to FIG. 3, the first vacuum sensor 610 comprises a housing 611 extending into the vacuum chamber 602. The housing 611 has a diaphragm 612 mounted within the interior of the housing to form therewith first and second chambers 613 and 614 on opposite sides of the diaphragm. The first chamber 613 is connected to the vacuum chamber 602 of the power cylinder 601 while the second chamber 614 is connected to the atmosphere. A return spring 615 is located in the first chamber 615 for urging the diaphragm 612 toward the second chamber 614; namely, to the left, as viewed in FIG. 3. The second chamber 614 contains the first pressure switch 61 which is shown as including movable and stationary contacts 616 and 617. When the pressure in the vacuum chamber 602 is sufficiently lower than the atmospheric pressure, the pressure differential across the diaphragm 612 overcomes the bias supplied by the return spring 615 so as to open the first pressure switch 61. The diaphragm 612 will close the first pressure switch 61 by pushing the movable contact 616 into the contact with the stationary contact 617 if the pressure in the vacuum chamber 602 exceeds over the first reference level which is determined by a selection of the strength of the return spring 615 to permit the brake booster 600 to perform properly. It is to be understood that the second vacuum sensor 650 may have the same structure as that shown in FIG. 3 except that the second pressure switch 65 closes when the pressure in the vacuum chamber 602 is below a second reference level lower than the first reference level.

Referring back to FIG. 1, the pressure level sensor 60 is connected to a fuelcut inhibition circuit 70. The fuelcut inhibition circuit 70 includes a transistor 72 whose base is connected through a resistor 71 to the output of the flip-flop 66. The transistor 72 has an emitter grounded and a collector connected to a source of constant voltage V4 through a relay 73 associated with a normally closed relay switch 74. When the signal F is supplied from the pressure level sensor 60 to the fuelcut inhibition circuit 70, the transistor 72 conducts to energize the relay 73, causing the relay switch 74 to open.

The fuelcut control circuit, which is generally designated by reference numeral 80, includes an AND circuit 81 connected at its first input to the output of the delay circuit 12 of the throttle position sensor 10 and at its second input to the output of the OR circuit 34 of the gear position sensor 20. The output of the AND circuit 81 is connected through a resistor 82 to the base of a transistor 83 whose emitter is grounded. The collector of the transistor 83 is connected to one terminal of a relay 84 whose other terminal is connected to a source of constant voltage V5 through the relay switch 74 associated with the relay 73 of the fuelcut inhibition circuit 70. The relay 84 is associated with a fuelcut device such as, for example, a solenoid valve situated within a fuel conduit for blocking fuel flow to the engine when closed. For an automotive vehicle utilizing an electronic fuel control unit, the fuelcut device may block current flow through one or more injection nozzle coils.

When the AND circuit 81 receives at its first input the signal A from the throttle position sensor 10 and at its second input the signal B from the gear position sensor 20, the output of the AND circuit 81 goes high to generate a signal G. The signal G is supplied through the resistor 82 to render the transistor 83 conductive so as to energize the relay 84, causing the fuelcut device to terminate delivery of fuel to the engine. Thus, the fuelcut control circuit 80 terminates fuel delivery to the engine only when the two conditions are fulfilled, that is, when the throttle valve position is at an angle less than the predetermined value, and the transmission is in high gear or in neutral. If the two conditions are not achieved, the fuelcut control circuit 80 will resume fuel delivery to the engine. If the pressure level sensor 60 generates the signal F to open the relay switch 74, however, the relay 84 will remain deenergized to inhibit the termination of fuel delivery to the engine in spite of the presence of the signal G.

The restart control circuit, which is generally designated by reference numeral 90, includes an AND circuit 91 connected at its first input to the output of the delay circuit 30 of the gear position sensor 20 and at its second input to the output of the delay circuit 42 of the clutch position sensor 40. The output of the AND circuit 91 is connected to a first input of another AND circuit 92 whose second input is connected the output of the comparator 53 of the engine speed sensor 50. The output of the AND circuit 92 is connected to a first input of an OR circuit 94 whose second input is connected to the output of an AND circuit 93. The AND circuit 93 has a first input connected to the output of the comparator 53 and a second input connected to the output of the flip-flop 66 of the pressure level sensor 60. The output of the OR circuit 94 is connected through a resistor 95 to the base of a transistor 96 whose emitter is grounded. The collector of the transistor 96 is connected to a source of constant voltage V6 through a relay 97 associated with an engine restart device which may drive or actuate a starter (not shown but well known in the art) to restart the engine when the relay 97 is energized.

When the AND circuit 91 receives at its first input the signal C from the gear position sensor 20 and at its second input the signal D from the clutch position sensor 40, the output of the AND circuit 71 goes high to generate a signal H. When the AND circuit 92 receives at its first input the signal H from the AND circuit 91 and at its second input the signal E from the engine speed sensor 50, the output of the AND circuit 92 goes high to generate a signal I. When the AND circuit 93 receives at its first input the signal E from the engine speed sensor 50 and at its second input the signal F from the pressure level sensor 60, the output of the AND circuit 93 goes high to generate a signal J. In the presence of the signal I from the AND circuit 92 or the signal J from the AND circuit 93, the output of the OR circuit 94 goes high to generate a signal K. The signal K is supplied through the resistor 95 to render the transistor 96 conductive so as to energize the relay 97, causing the restart device to restart the engine. Thus, the restart control circuit 90 restarts the engine when the three conditions are fulfilled, that is, when the transmission is in low gear, the clutch is disengaged, and the engine is operating at a speed less than the predetermined value, or the two conditions are fulfilled, that is, when the engine is operating at a speed less than the predetermined value, and the pressure in the brake-booster vacuum chamber 602 increases over the first predetermined level. If these three conditions and these two conditions are not achieved, the restart control circuit 90 cannot restart the engine.

In operation, when in order to start the engine, the driver depresses the accelerator pedal to advance the throttle over the predetermined value and turns the key switch into its start position with the transmission being held in neutral, the throttle position sensor 10 terminates the generation of the signal A, the gear position sensor 20 generates the signal B, and the clutch position sensor 40 terminates the generation of the signal D. In the absence of the signal A, the fuelcut control circuit 80 cannot terminates delivery of fuel to the engine. In the absence of the signal D, the restart control circuit 90 cannot restart the engine. In this state of the circuit, the engine is supplied with fuel and driven by the starter so that the engine can start smoothly in the same manner as normal engines.

Thereafter, the driver may start the vehicle from the rest by depressing the clutch pedal to disengage the clutch and operating the shift lever to select the first forward speed gear. During these operations, the gear position sensor 20 generates the signal C, the clutch position sensor 40 generates the signal D, and the engine speed sensor 50 terminates the generation of the signal E since the engine is operating at a speed more than the reference value. In the absence of the signal B, the fuelcut control circuit 80 cannot terminate fuel delivery to the engine. In the absence of the signal E, the restart control circuit 90 cannot restart the engine. As a result, the vehicle can start smoothly without unnecessary engine restart in the same manner as normal engines.

To accelerate the vehicle thereafter, the driver may depress the clutch pedal to disengage the clutch and operate the shift lever to change the gear position from the first forward speed gear to the second forward speed gear. In the course of such gear position change, the transmission comes into neutral and the clutch pedal is released to cause the gear position sensor 20 to change its output from the signal C to the signal B and the throttle valve may move in a closing direction past the predetermined throttle angle to cause the throttle position sensor 10 to change its output to the signal A. However, the time constants ta and tc are properly selected such as to hold the throttle and/or gear position sensor outputs unchanged for a time normally required for the driver to complete the gear position change. Because of this, the fuelcut control circuit 80 cannot terminate fuel delivery to the engine. In addition, the restart control circuit 70 cannot restart the engine under these conditions. The same explanation may be applied for vehicle acceleration with the gear position being changed from the second forward speed gear to the third forward speed gear, with the gear position being changed from the third forward speed gear to the fourth forward speed gear, and with the gear position being changed from the fourth foward speed gear to the fifth foward speed gear.

To decelerate the vehicle without operating the shift lever, the driver may release the accelerator pedal and depress the brake pedal. If the vehicle is decelerated in this manner when the transmission is in high gear, the throttle position sensor 10 generates the signal A and the gear position sensor 20 generates the signal B, causing the fuelcut control circuit 80 to terminate fuel delivery to the engine. In the course of such vehicle deceleration, depressing the brake pedal several times causes an increase of the pressure in the brake-booster vacuum chamber 602. When the pressure in the brake-booster vacuum chamber 602. When the pressure in the brake-booster vacuum chamber 602 increases over the first reference level, the pressure level sensor 60 generates the signal F, causing the fuelcut inhibition circuit 70 to disable the fuelcut control circuit 80 so as to resume fuel delivery to the engine and also the restart control circuit 90 to restart the engine. As a result, the pressure in the brake-booster vacuum chamber 602 will decrease. When the pressure in the brake-booster vacuum chamber 602 falls below the second reference level, the pressure level sensor 60 terminates the generation of the signal F, causing the fuelcut control circuit 80 to terminate fuel delivery to the engine and also the restart control circuit 90 to stop restarting the engine. If these conditions continue, the vehicle will come to a stop with the engine being held still. This can save fuel unnecessary deceleration and also fuel required for a normal engine when the engine is idling during a wait for the traffic lights to change.

To accelerate the vehicle in the course of such vehicle deceleration, the driver may depress the accelerator pedal to advance the throttle valve over the predetermined angle. This causes the throttle position sensor 10 to terminate the generation of the signal A, thereby causing the fuelcut control circuit 80 to resume fuel delivery to the engine. Upon the resumption of the fuel delivery to the engine, the engine can restart smoothly by the aid of driving forces from the driver wheels since the transmission is held in high gear.

Alternatively, the vehicle may be decelerated by so-called engine brake or braking forces caused by loads created during the compression phase of engine operation. For this purpose, the driver operates the shift lever to change the gear position from the fifth forward speed gear to the fourth forward speed gear or from the fourth forward speed gear to the third forward speed gear. During this operation, the throttle position sensor 10 generates the signal A and the gear position sensor 20 generates the signal B, which causes the fuelcut control circuit 80 to terminate fuel delivery to the engine. This is effective to save more fuel than is possible for automotive vehicles having no circuit for terminating fuel delivery to the engine during deceleration.

If the driver operates the shift lever to change the gear position from the third foward speed gear to the second forward speed gear, the engine will be restarted. That is, the gear position sensor 20 terminates the generation of the signal B, causing the fuelcut control circuit to resume fuel delivery to the engine. In addition, the gear position sensor 20 generates the signal C, the clutch position sensor 40 generates the signal D, and the engine speed sensor 50 generates the signal E since the fuelcut control circuit 80 has terminated fuel delivery to the engine when the third forward speed gear was selected and the engine comes to a stop due to loads created during the compression phase of engine operation upon the depression of the clutch pedal. In the presence of the three signals C, D and E, the restart control circuit 90 restarts the engine. Thus, the engine can be decelerated or accelerated again without impacts caused by driving forces from the drive wheels when the gear position is changed from a high gear to a low gear having a larger gear ratio.

If the driver operates the shift lever to place the transmission in neutral and holds the accelerator pedal undepressed after the engine is decelerated with the second forward speed gear being selected until the vehicle comes to a stop, the fuelcut control circuit 80 will terminate fuel delivery to the engine. This is effective to save fuel required for normal engine when the engine is idling during a wait for the traffic lights to change.

During such deceleration, if the pressure in the brake-booster vacuum chamber 602 increases over the first reference level, the fuelcut control circuit 80 resumes fuel delivery to the engine and the restart control circuit 90 restarts the engine so as to adjust the pressure in the brake-booster vacuum chamber 602. This is effective to assure safety during vehicle running.

To start the vehicle from rest, the driver may depress the clutch pedal to disengage the clutch and operate the shift lever to select the first or second forward speed gear or the reverse gear. During these operations, the gear position sensor 20 terminates the generation of the signal B, causing the fuelcut control circuit 80 to resume fuel delivery to the engine and generates the signal C. In addition, the clutch position sensor 40 generates the signal D and the engine speed sensor 50 generates the signal E. As a result, the restart control circuit 90 restarts the engine. Thus, the vehicle can start smoothly from rest in the same manner as normal automotive vehicles having no circuit for terminating fuel delivery to the engine during deceleration.

Figure 4:
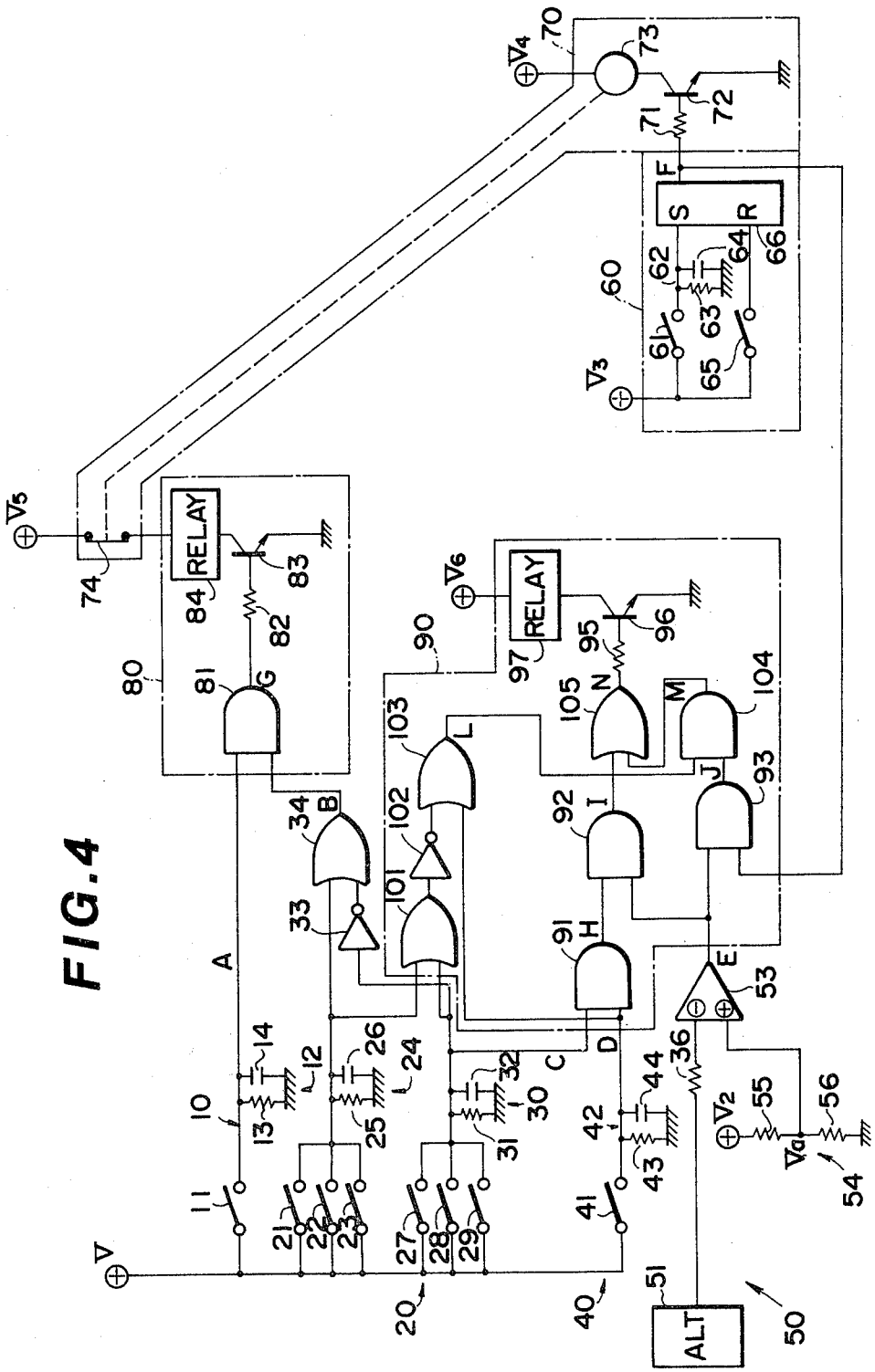
FIG. 4 is a circuit diagram showing a second embodiment of the present invention.
Figure 5:
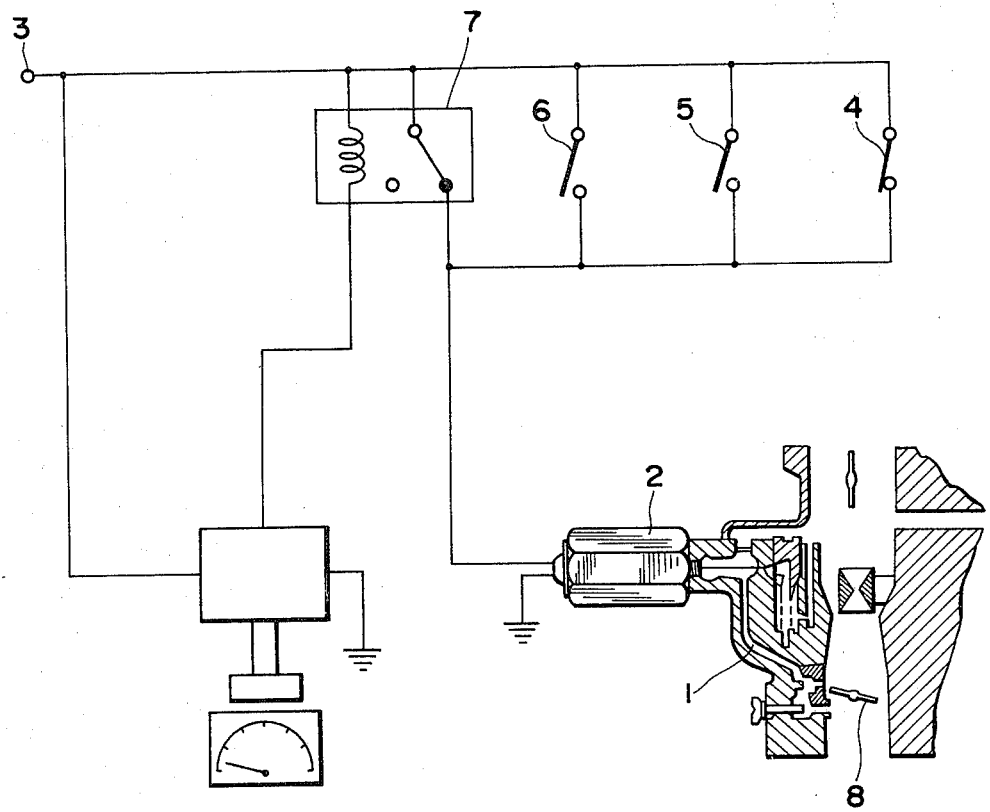
FIG. 5 is a circuit diagram showing a conventional engine control circuit.

Referring now to FIG. 4, similar apparatus to that shown in FIG. 1 has been illustrated and similar parts have been given the same reference numeral. In the embodiment shown in FIG. 4, it will be seen that the restart control circuit 90 includes an OR circuit 101 which has a first input connected to the output of the delay circuit 24 of the gear position sensor 20 and a second input connected to the output of the delay circuit 30 of the gear position sensor 20. The output of the OR circuit 101 is connected through an inverter 102 to a first input of an OR circuit 103 whose second input is connected to the output of the delay circuit 42 of the clutch position sensor 40. The output of the OR circuit 103 goes high to generate a signal L when the transmission is in neutral or the clutch is disengaged. The output of the OR circuit 103 is connected to a first input of an AND circuit 104 whose second input is connected to the output of the AND circuit 93. The output of the AND circuit 104 goes high to generate a signal M when it receives at its first input the signal L and at its second input the signal F, that is, when the transmission is in neutral or the clutch is disengaged and when the engine is operating at a speed less than the predetermined value and the pressure in the brake-booster vaccum chamber 602 increases over the first predetermined level. The output of the AND circuit 104 is connected to a second input of an OR circuit 105 whose first input is connected to the output of the AND circuit 92. The output of the OR circuit 105 goes high to generate a signal N when it receives at its first input the signal L or at its second input the signal M. The signal N is supplied through the resistor 95 to render the transistor 96 conductive so as to energize the relay 97, causing the restart device to restart the engine. Thus, the restart control circuit 90 restarts the engine when the three conditions are fulfilled, that is, when the transmission is in low gear, the clutch is disengaged, and the engine is operating at a speed less than the predetermined value. The restart control circuit 90 restarts the engine also when the transmission is in neutral or the clutch is disengaged upon the occurrence of the two conditions, that is, when the engine is operating at a speed less than the predetermined value and the pressure in the brake-booster vacuum chamber 602 increases over the first predetermined level.

It can be seen that the embodiment in FIG. 4 differs from the first embodiment only in that the restart control circuit includes an additional means for preventing the restart device from restarting the engine until the transmission is shifted into neutral or the clutch is disengaged in spite of the occurrence of the two conditions where the engine is operating at a speed less than the predetermined value and the pressure in the brake-booster vacuum chamber 602 increases over the first predetermined level. This means is effective to prevent rapid acceleration and rapid start when the engine is restarted.

While the present invention has been described in conjunction with specific embodiments thereof, it is evident that many alternatives, modifications and variations will be apparent to those skilled in the art. Accordingly, it is intended to embrace all alternatives, modifications and variations that fall within the spirit and broad scope of the appended claims.

What is claimed is:

1. An apparatus for controlling an internal combustion engine of an automotive vehicle having a transmission, a clutch, a throttle valve, a brake booster storing therein pressure supplied from an engine intake manifold, and sources for generating signals indicative of: (a) the throttle valve opening at an angle less than a predetermined value, (b) the transmission being in high gear or in neutral, (c) the transmisson being in low gear, (d) the clutch being disengaged, and (e) the engine operating at a speed less than a predetermined value, said apparatus comprising first means for generating a signal (f) when the pressure in the brake booster increases over a first predetermined value, the first means terminating the generation of the signal (f) when the pressure in the brake booster falls below a second predetermined value lower than the first predetermined value, second means for terminating delivery of fuel to the engine upon the occurrence of two conditions indicated by signals (a) and (b), third means for restarting the engine upon the occurrence of three conditions indicated by signals (c), (d) and (e) or upon the occurrence of two conditions indicated by signals (e) and (f), and fourth means for preventing the second means from terminating fuel delivery to the engine upon the occurrence of one condition indicated by signal (f).

2. The apparatus of claim 1, wherein the second means comprises an AND circuit for generating a signal (g) upon the generation of two signals (a) and (b), a source of constant voltage, a fuelcut device for terminating fuel delivery to the engine when connected to the source of constant voltage, and means responsive to the signal (g) for connecting the fuelcut device to the source of constant voltage.

3. The apparatus of claim 2, wherein the fourth means comprises a switch provided between the source of constant voltage and the fuelcut device, and means responsive to the signal (f) for opening the switch to disconnect the fuelcut device from the source of constant voltage.

4. The apparatus of claim 1, wherein the first means comprises means for generating a set signal when the pressure in the brake booster is above the first predetermined value, the means generating a reset signal when the pressure in the brake booster is below the second predetermined value, and a bistable circuit responsive to the set signal for changing to its second stable state generating the signa (f), the bistable circuit being responsive to the reset signal for returning to its first stable state terminating the generation of the signal (f).

5. The apparatus of claim 1, wherein the third means comprises an AND circuit for generating a signal (h) upon the generation of two signals (c) and (d), and AND circuit for generating a signal (i) upon the generation of two signals (e) and (h), an AND circuit for generating a signal (j) upon the generation of two signals (e) and (f), an OR circuit for generating a signal (k) upon the generation of the signal (i) or (j), and means responsive to the signal (k) for restarting the engine.

6. The apparatus of claim 1, wherein the third means comprises means for preventing the third means from restarting the engine until the transmission is shifted into neutral or the clutch is disengaged in spite of the occurrence of two conditions indicated by signals (e) and (f).

7. The apparatus of claim 6, wherein the third means comprises means for generating a signal (l) when the transmission is in neutral or the clutch is disengaged, an AND circuit for generating a signal (h) upon the generation of two signals (c) and (d), an AND circuit for generating a signal (i) upon the generation of two signals (e) and (h), an AND circuit for generating a signal (j) upon the generation of two signals (e) and (f), an AND circuit for generating a signal (m) upon the generation of two signals (l) and (j), an OR circuit for generating a signal (n) upon the generation of one signal (i) or (m), and means responsive to the signal (n) for restarting the engine.

* * * * *